United States Patent [19]

Touchton et al.

[11] 4,051,423
[45] Sept. 27, 1977

[54] SERVO SYSTEM WITH FEEDBACK SIGNAL COMPENSATION

[75] Inventors: James J. Touchton, Santa Clara; John Cuda, Saratoga; Frank J. Sordello, Los Gatos, all of Calif.

[73] Assignee: Sperry Rand Corporation, New York, N.Y.

[21] Appl. No.: 656,897

[22] Filed: Feb. 10, 1976

[51] Int. Cl.$^2$ ............................................... G05B 5/01
[52] U.S. Cl. ..................................... 318/611; 318/619; 318/620
[58] Field of Search ............... 318/632, 611, 619, 620, 318/621, 622

[56] References Cited

U.S. PATENT DOCUMENTS

| 3,324,365 | 6/1967 | Jones | 318/632 |
| 3,422,325 | 1/1969 | Gerber et al. | 318/632 X |
| 3,466,516 | 9/1969 | Goplen et al. | 318/611 |
| 3,893,011 | 7/1975 | Inaba et al. | 318/632 X |

*Primary Examiner*—B. Dobeck
*Attorney, Agent, or Firm*—Gerald L. Moore

[57] ABSTRACT

A signal compensator for a position servo loop system to attenuate the position error signal and provide stability at a larger band width by limiting the position actuator current in selected frequency ranges.

10 Claims, 9 Drawing Figures

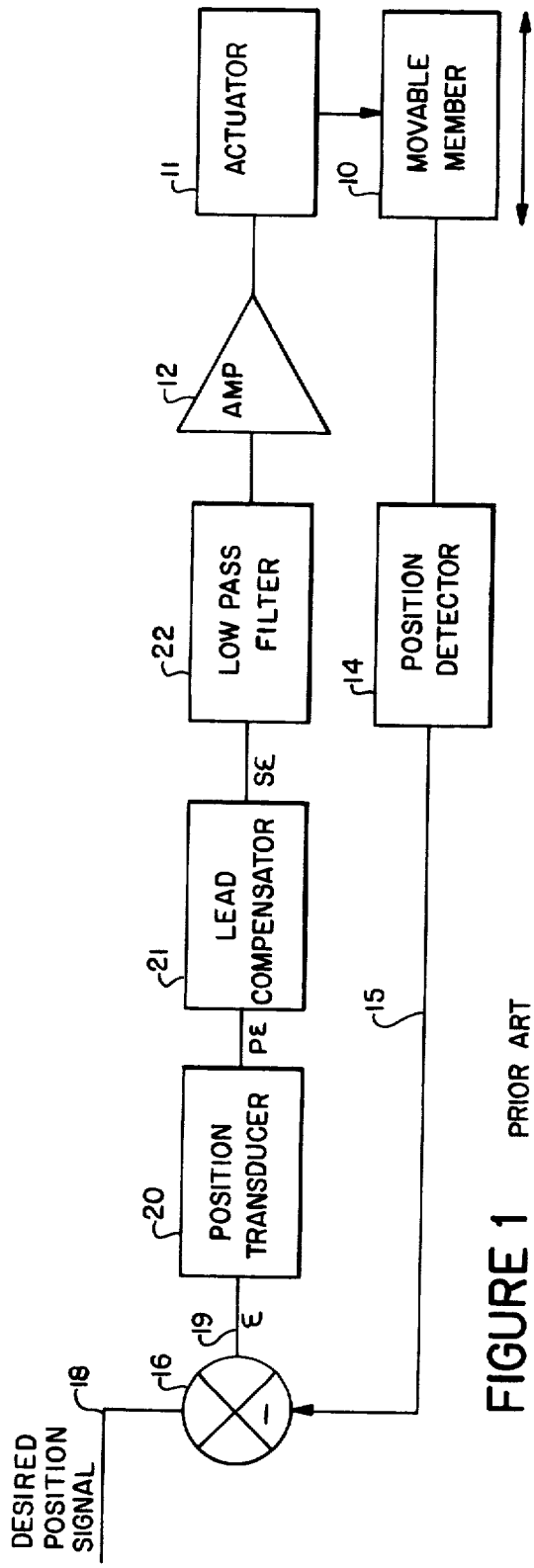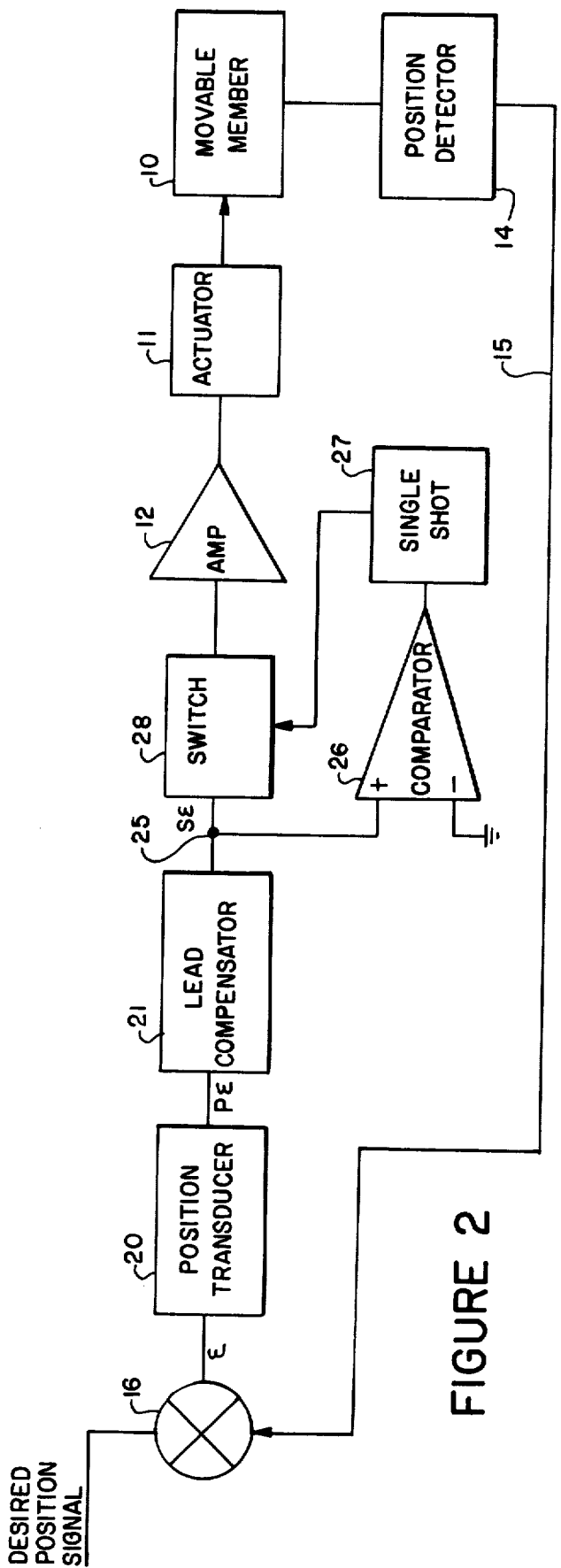
FIGURE 1 PRIOR ART
FIGURE 2

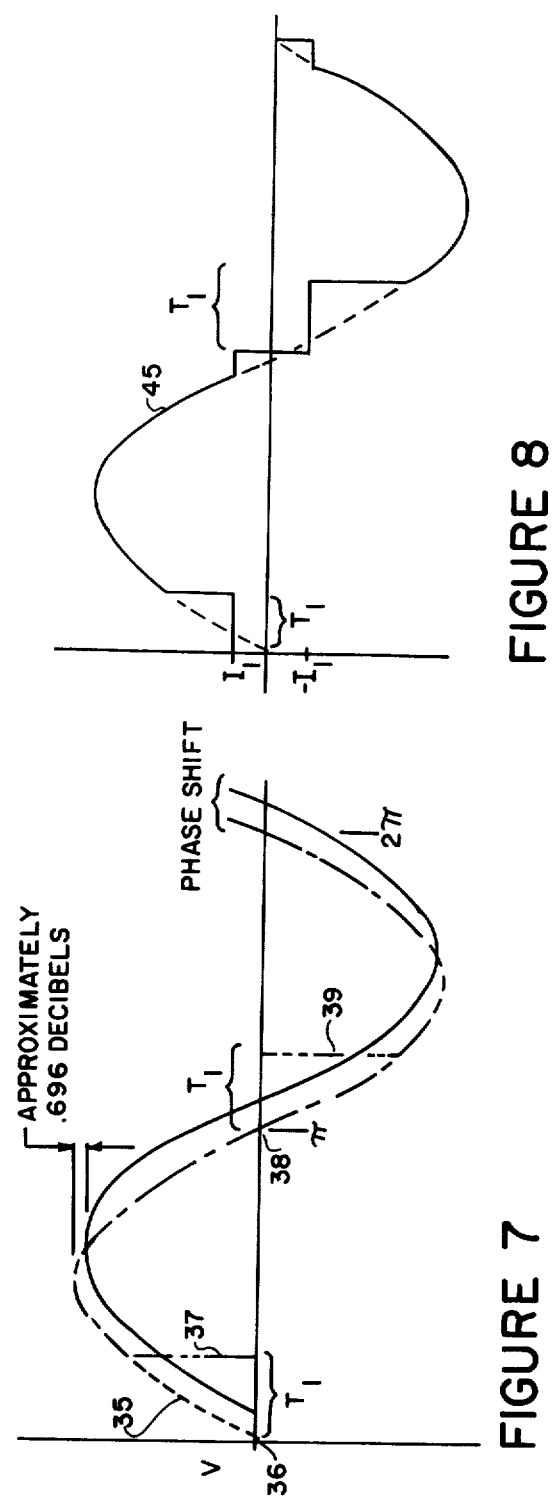

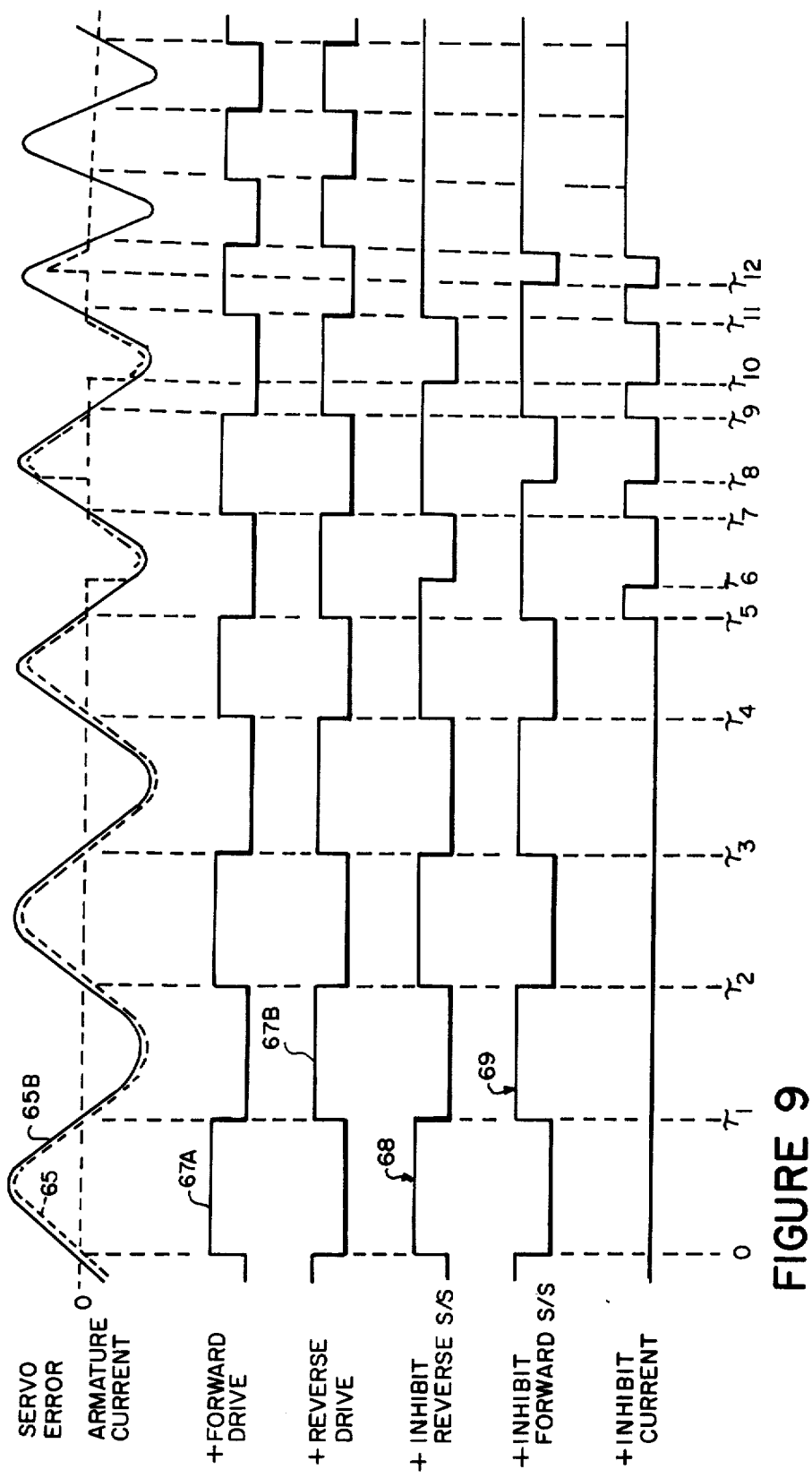

SERVO SYSTEM WITH FEEDBACK SIGNAL COMPENSATION

BACKGROUND OF THE INVENTION

In servo systems and particularly in position loop servo systems used for positioning a movable member by use of a position feedback signal, there exists the problem of mechanical resonance. Mechanical resonance is oscillation of the circuit and movable member at a frequency or frequencies at or near the natural resonant frequency of the system. Such occurs because of the play or tolerance within the mechanical system and the inability of the servo system to distinguish between actual position error and error due to the looseness in the mechanical system. Attempts to eliminate or reduce the possibility of such resonance have included the use of filters to attenuate the position error signals at frequencies near the natural resonant frequency of the system.

A first problem arises from attenuating the feedback signal with filters in that the overall reaction of the system is reduced thereby requiring a longer time period to position the movable member at a desired location, especially in the areas of the attenuated signal frequencies. Still another problem results from the fact that such attenuation is usually accomplished by an electrical filter. However, such filters also usually cause a phase shift of the feedback signal and at times the phase shift in the feedback signal can cause the system to perform worse than it did without the filter even though some attenuation of the feedback signal is achieved. Therefore there remains the problem of compensating for the magnitude and the phase shift and one circuit for accomplishing this is shown in U.S. Pat. No. 3,808,486 entitled: Selective Frequency Compensation For A Servo System, issued on Apr. 3, 1974. In this patent the gain is increased in a particular frequency range to reduce the possiblity of instability caused by mechanical resonance in the system at other frequency ranges. However there results a phase shift and to compensate for this shift this patent describes a special circuit to be utilized in such feedback systems. There also remains the need to dither or cause a slow oscillation in a position loop servo system to reduce the effects of friction and inertia of the movable member. However, most efforts to damp a position loop servo system will exclude the possibility of dithering. This exclusion of the dithering operation slows the functioning of the system or produces a large steady state error.

It is therefore the object of this invention to provide a means for preventing high frequency mechanical resonance instabilities in a position loop servo system, while not substantially affecting the operation of the system in other lower frequency ranges. It is a further object of this invention to enhance the operation of a position loop servo system by providing means for attenuating the position error signal at higher frequency ranges and enhancing the position error response of the system at other frequency ranges.

SUMMARY OF THE INVENTION

A position loop servo system used for positioning a movable member in response to a position error signal generated by a position transducer acting responsive to the position of the movable member and including means for deleting a segment of the error signal. In one embodiment the invention includes a single shot which is fired at the zero crossover point of a cyclic error signal. The single shot eliminates a portion of the error signal with very little resulting phase shift. At low frequency the error signal is attenuated and at higher frequencies the signal is eliminated completely thereby serving to attenuate the position error signal at selected frequencies to prevent mechanical resonance.

DESCRIPTION OF THE DRAWINGS

FIG. 1 is a block diagram of one typical prior art position servo loop system in which the invention can be used;

FIG. 2 shows a first embodiment of the invention;

FIG. 7 shows the attenuation of the actuator current signal of the circuit in FIG. 2 for different frequencies;

FIG. 8 shows the actuator current signal for the circuit of FIG. 3; and

FIG. 9 shows the servo error signal actuator current, and timing diagram for the circuit of FIG. 4;

DESCRIPTION OF THE INVENTION

Figure 3:
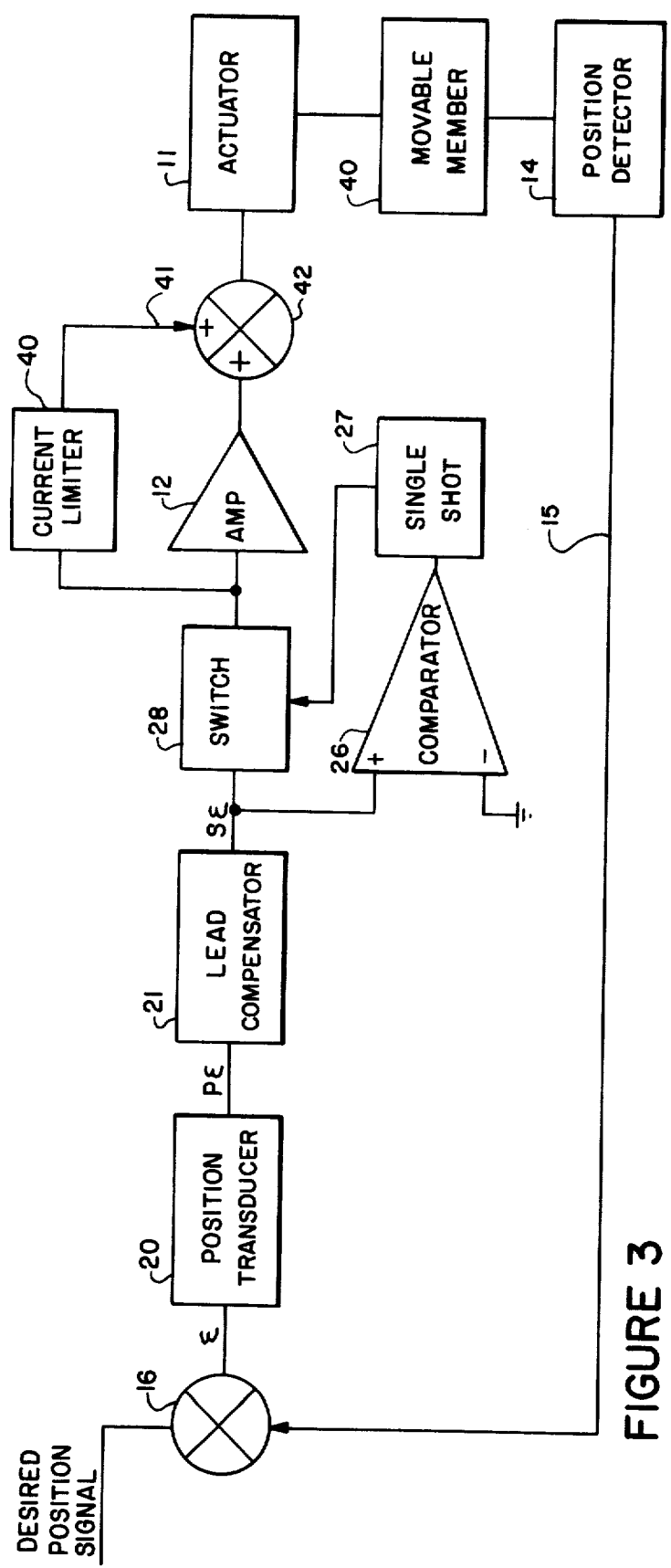
FIGS. 3, 4 and 5 show still other embodiments of the invention.

In FIG. 1 is shown a prior art position loop servo system used for the purpose of positioning a movable member 10. An actuator 11 is provided which when energized by a cyclic signal from a power amplifier 12 having varying polarities to move the movable member to various positions. A position detector 14 senses the position of the movable member and through the conductor 15 provides to the juncture 16 a position signal. This signal is combined with a desired position signal supplied to the conductor 17 from source 18. This desired position signal indicates the position to which the movable member should be moved. The resultant position error signal is supplied through the conductor 19, amplified and converted to a voltage signal responsive to position by the transducer 20 and transmitted through the lead compensator 21. This lead compensator serves to stabilize the undamped type 2 servo loop illustrated. The resultant signal is then transmitted to the amplifier 12 for amplification to create a cyclic power signal for transmittal to the actuator 11 through a power circuit for causing movement of the movable member towards the desired position by a change in polarities of the power signal. Such closed loop position servo systems are well known and used extensively.

Figure 6:
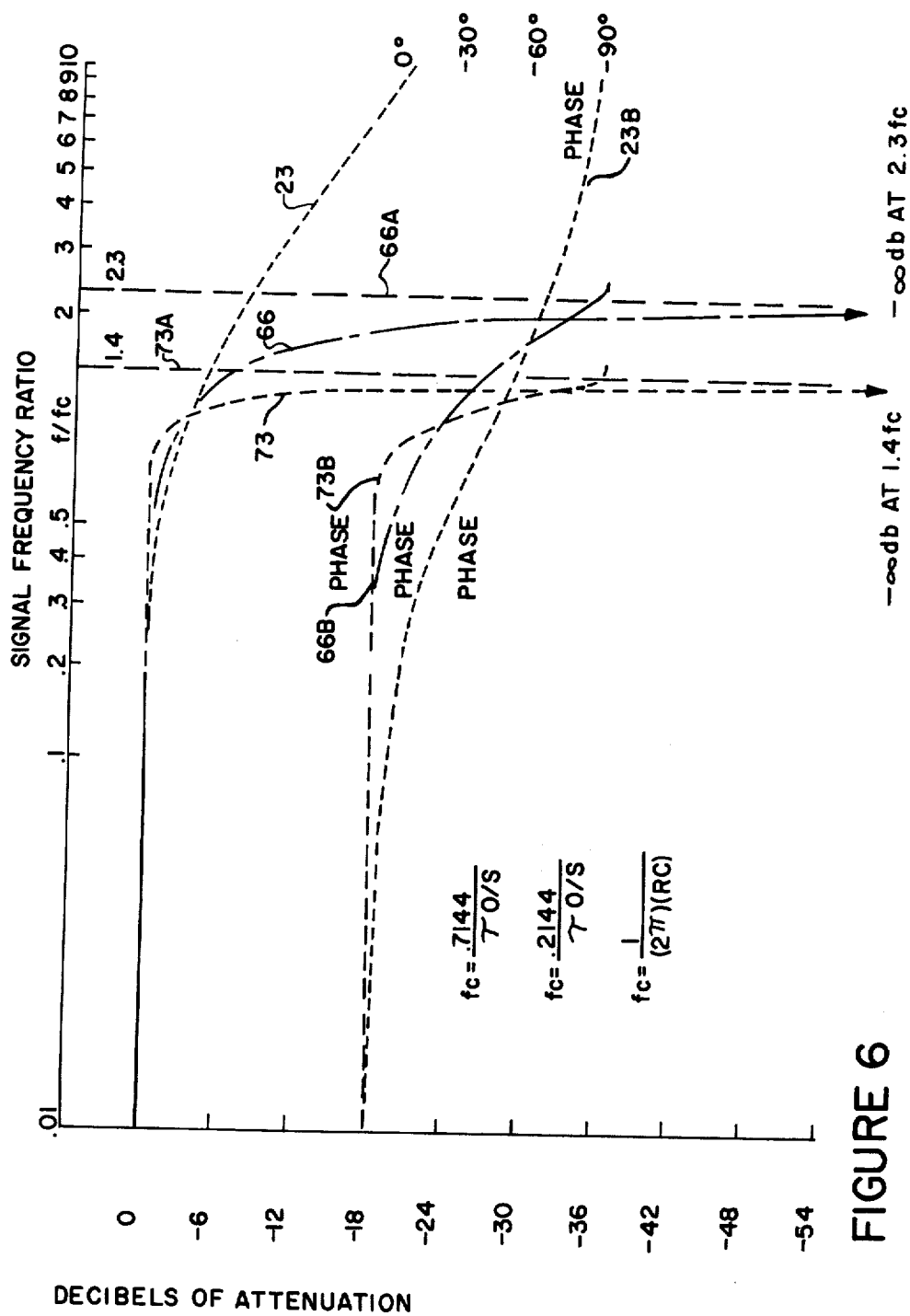
FIG. 6 is a plot of signal frequencies versus attenuation for various embodiments of the invention.

As pointed out before, a closed loop position servo system such as is shown in FIG. 1 exhibits certain properties which are undesirable. For instance, the mechanical resonance discussed heretofore results in the oscillation of the system at various frequencies, usually in the higher frequency ranges, because of the character of the mechanical structure of the movable member and the inability of the system to damp the feedback signal sufficiently to prevent instability. For the elimination of the effect of such high frequency error signals, there have been used in the past low pass filters such as a filter 22 shown in FIG. 1. Such filters are partially effective in attenuating the signal at the higher frequency ranges at the expense of a lagging phase shift at lower frequencies. For instance, as shown in the graph of FIG. 6 illustrating the decibel attenuation versus frequency, the RC filter causes a gradual attenuation of the signal as illustrated by the plotted curve 23. At the same time, however, there will exist a phase shift approaching −90°. Thus the RC filter network presents disadvantages in operation with a position loop servo system in that while it serves to eliminate or diminish the response of the servo system to the higher frequency error signals, it also causes a phase shift in the error signal.

In accordance with the present invention, there is provided means for attenuating the error signal at selected frequency ranges with less phase shift in the resultant signal. Thus as shown in FIG. 2 there are provided in the basic position loop servo system the components described relative to FIG. 1, namely the movable member 10, the actuator 11, the power amplifier 12, the position detector 14, the error feedback circuit 15, the junction 16, the position transducer 20 and the lead compensator 21. These components function as previously described in the description of the prior art of FIG. 1. In accordance with the invention there is provided connecting at the juncture 25 a circuit including a zero crossing detector or comparator 26 and a single shot 27, which single shot controls a switch 28 connected in series between the lead compensator 21 and the amplifier 12. Thus with the opening of the switch 28, the cyclic signal for energizing the actuator is prevented from being transmitted to the amplifier 12.

As can be seen from the foregoing, the zero crossing detector in the form of a comparator 26 provides a signal effective to time and fire the single shot 27 each time a zero crossing of the servo error signal is detected. With the firing of the single shot 27, the switch 28 is opened for a predetermined time period. Thus as shown in FIG. 7, the original error signal would appear as the curve 35.

With the crossing of the error signal through the zero value at point 36, the single shot 27 is fired which opens the switch 28 for a predetermined time period $T_1$. Thus the error signal actually transmitted appears as the waveform 37 having a zero amplitude for the same time period $T_1$. Similarly when the waveform crosses through the zero point at point 38, the single shot again is fired to time out through the same time period $T_1$.

The effective waveform 39 thus is transmitted on to the amplifier 12 having a slight phase shift of approximately −10° and a magnitude reduced by approximately 0.696 decibels at 60% of the corner frequency as shown in FIG. 7. The effective waveform 39 is the fundamental frequency having a sinusoidal waveform. It is realized that there will be generated other harmonics of this signal of lesser magnitude, however for purposes of clarification and explanation, these harmonic frequencies will be disregarded. Such an assumption is reasonable because in actuality, the harmonic frequencies do not have a great effect on the error signal. It can be seen that there is achieved a significant reduction in the magnitude of the error signal with only a slight phase shift. It can also be realized that by firing the single shot at each zero crossover for a predetermined time period, the real effect of the single shot is realized at higher frequencies where resonance of the system is likely to occur. For instance frequencies having a one-half cycle time period less than the time period $T_1$ will be completely eliminated while slightly lower frequency signals will be attenuated proportionally less.

To understand the effect of the attenuation of the position error signal, there is shown in FIG. 6 a plotting of the resultant signal for various frequencies. The dot-dash line 66 shows the attenuation of the signal for the circuit of FIG. 2. As can be seen, the signal becomes asymtotic to a line 66A at 2.3 times the low pass corner frequency. This low pass corner frequency represents the band width of the filter which is −3 decibels.

In FIG. 3 is shown still another embodiment of the invention including all of the components previously described with respect to FIG. 2. It has been found, however, that in some embodiments of such closed loop position servo systems, it is preferable to always provide some level of error signal for purposes of dithering as previously described. For this reason there is included in the embodiment of FIG. 3 a current limiter 40 which receives the error current signal transmitted through the switch 28 and feeds a current responsive to that current signal through the conductor 41 into the junction 42. This current limiter functions to always supply a predetermined minimum level of current to the junction 42 when no current is flowing to the amplifier 12 from the switch 28. Thus as shown in FIG. 8 wherein the normal feedback current appears as the curve 45 and the single shot acting through the switch 28 limits the current to a zero value during the time period $T_1$ following each zero crossing point, in actuality the current limiter will always hold the level of the current to the minimum value $I_1$. Thus if no current is called for by the position error signal, there will always be supplied this minimum current level which serves as a dithering current in the manner previously described.

Figure 4:
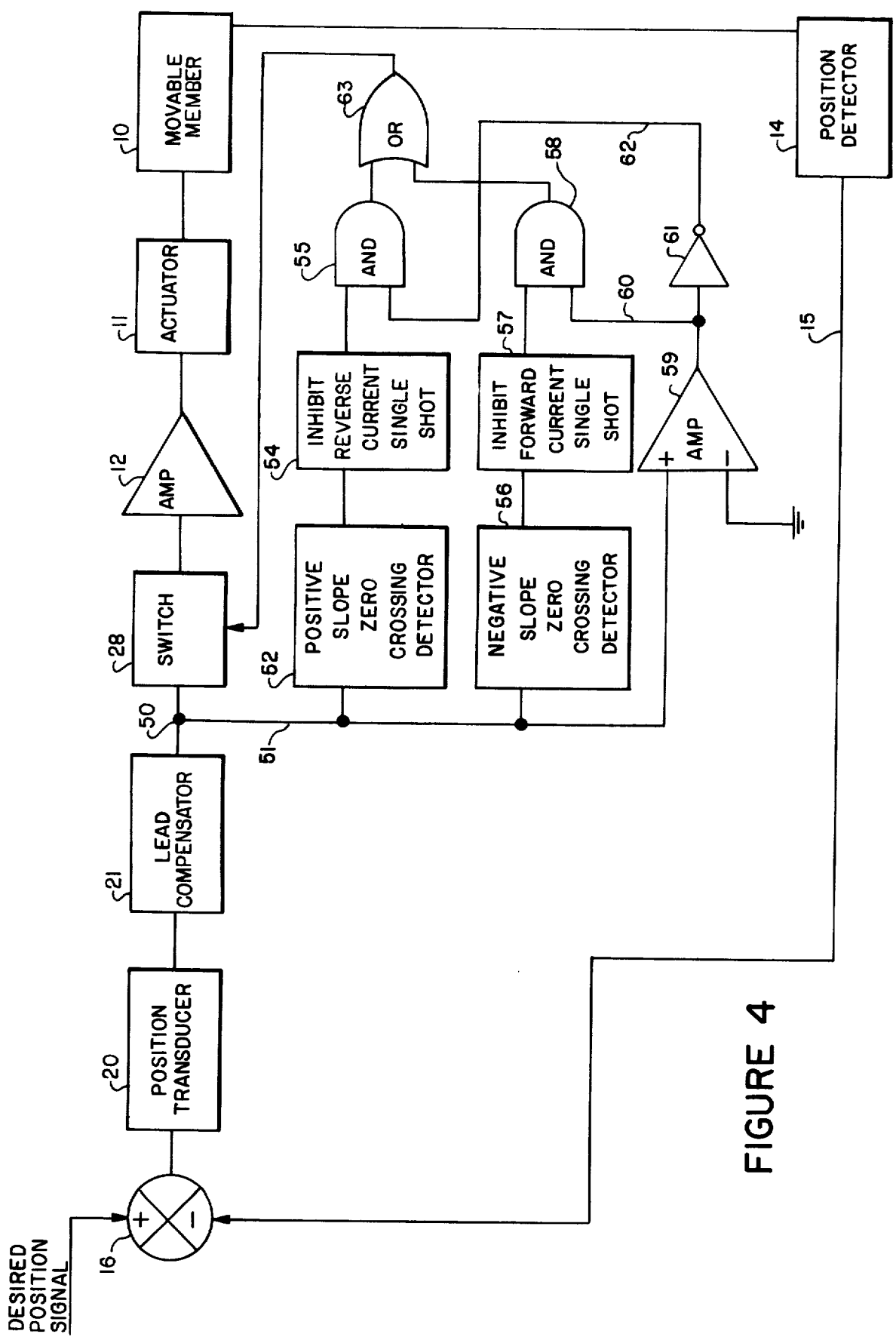

Still another embodiment of the invention is illustrated in FIG. 4 wherein is shown the basic servo system including the components previously described comprising the movable member 10, the actuator 11, the amplifier 12, the position detector 14, the error feedback circuit 15, the juncture 16, the position transducer 20, the lead compensator 21 and the switch 28. In this embodiment, however, the error signal is only blanked when the period of the one shot exceeds one-half the period of the waveform. Therefore the overall effect of the control is to eliminate the reduction in magnitude of the servo error signal when low frequency error signals are being transmitted in the position servo loop thereby permitting the servo system to function with its normal high gain during the low frequency error signal periods.

In the previous embodiments, the single shot served to eliminate high frequency error signal feedback. However the circuit also serves to diminish slightly the magnitude of the feedback signal during low frequency operation. Such occurred because the single shot operated to eliminate some of the initial position of the error signal during both low and high frequency cycling. In the present embodiment of the system, the error signal is eliminated for that period of time only when the frequency of the error signal is such that the signal passes through the half-cycle point prior to the single shot timing out. For this purpose there is connected at the juncture 50 in FIG. 4 the conductor 51 which supplies the error signal to a pair of parallel connected circuits each comprising a slope and zero crossing point detector and a single shot for supplying a signal to an AND gate. The first circuit includes the positive slope zero crossing detector 52 and single shot 54 for supplying a signal to the AND gate 55. In parallel to that first circuit is the negative slope zero crossing detector 56 which controls the firing of a single shot 57 supplying a signal to the AND gate 58. The error signal is also fed to a comparator or differential amplifier 59 which supplies a signal directly to the AND gate 58 through the conductor 60 and in inverted form by passage of the signal through an inverter 61 and the conductor 62 to the AND gate 55. Thus the switch 28 in only turned off when a positive slope zero crossing is passed, along with the inverted form of the error signal or when the negative slope zero crossing point is passed which corresponds in polarity with the error signal. The control for switch 28 is generated by the OR gate 63.

To illustrate the operation of this control graphically, there is shown in FIG. 9 a plot of the error signal along with a timing chart showing the polarity of the various signals. The error signal appears as the curve 65 calling for a forward command signal 67A during one-half cycle and a reverse command signal 67B during the other half cycle. With the detection of a positive slope crossing point by the detector 52, the single shot 54 is fired during the time period of zero to $T_1$ as illustrated by the square waveform 68. Similarly when the negative slope zero crossing detector 56 detects passage of the waveform through the point 65B, the single shot 57 will be fired to generate a signal from the time period $T_1$ to $T_2$ as indicated by the waveform 69. Thus during the time period when the single shot 54 is fired from $T_5$ to $T_6$ and the waveform 65 is negative, that portion of the waveform will be eliminated. Similarly when the reverse single shot 57 is fired and the waveform 65 is positive from period $T_7$ to $T_8$ that portion of the waveform will be deleted.

It is possible in this embodiment of the invention to actually eliminate only a portion of the center of each half-cycle of the feedback error signal. Such is accomplished at a selected frequency range by timing the firing of the single shot a selected period so that it fires at a time period past the zero crossing and for a time period equalling the center portion of the signal half-cycle. Thus the magnitude of the error signal is reduced greatly with little or no phase shift resulting.

Referring once again to FIG. 6, the curve 73 actuator illustrates a plot of the attenuation of the current signal for various frequencies. Note that the attenuation is even sharper and the curve is asymtotic to a line at 1.4 times the corner frequency represented by the line 73A. Note further that the phase shift indicated by the line 73B is substantially less for the degree of attenuation of the signal. The sharper attenuation increase at higher frequencies occurs in part because of the elimination of any attenuation of lower frequency error signals.

It can also be seen from the foregoing that a portion of the actuator current will only be blank when the half-cycle time period of the signal is less than the time period for the single shot. Accordingly it can be seen that for signals having a lower frequency such that the one-half cycle time period exceeds that of the single shot, no portion of the signal will be deleted. Because of this effect, the closed servo loop system reaction time is not increased at the lower frequencies because the position error signal is not affected. Conversely at the higher frequencies the signal is attenuated to the point at which if the frequency is sufficiently high that the full cycle time period equals or is less than the time period of the single shot, no position error signal will be transmitted to the actuator. Thus it can be seen that the present embodiment of the invention serves to attenuate only the higher frequency signals with no corresponding effect on lower frequency position error signals. Of course by varying the time period of the single shot, the critical frequency at which attenuation is initiated can be varied in accordance with the particular requirements of each closed loop servo system. The determination of the critical frequency would usually depend upon the frequency or frequencies at which the servo system would tend to resonate.

Figure 5:
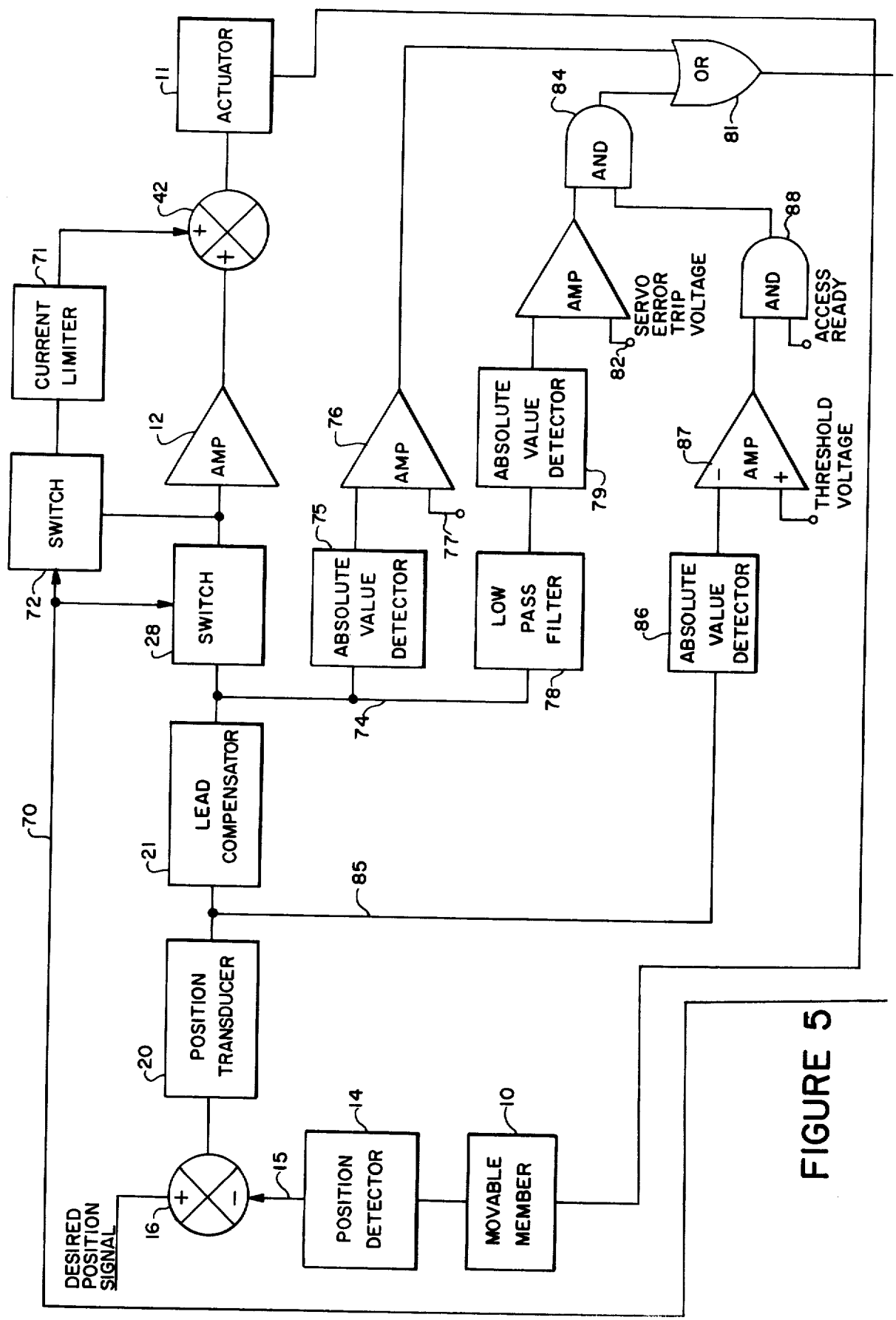

In FIG. 5 is shown still another embodiment of the invention. As in past embodiments, the basic servo system embodies the movable member 10, the actuator 11 with the actuator signal amplifier 12 in combination with a position detector 14, a position transducer 20 and a lead compensator 21. As described before, the position detector signal is fed through the conductor 15 to the juncture 16 where it is combined with a desired position signal and supplied for the position transducer for the generation of a position error voltage signal.

In conjunction with this basic circuit is supplied means for deleting the actuator current signal under conditions to eliminate problems of mechanical resonance while not substantially depreciating the functioning of the system during the normal operation in positioning the movable member. Thus in this embodiment there is provided the current limiter circuit which holds the current to a predetermined value under preselected conditions as described in the previous embodiment of FIG. 3. In addition there is provided means to prevent attenuation of the position servo signal when the error signal indicates that the movable member while approaching a desired position is not within a predetermined distance of that desired location. In addition there is also provided means for assuring that if the servo system having reached the desired position, detects that the movable member has now moved back out of the predetermined boundaries, attenuation of the position error signal is prevented so as not to limit the abilities of the system in returning the movable member towards the desired position.

In accordance with the invention, there is provided the switch 28 which functions as in previous embodiments to prevent the transmission of the position error signal when a signal is received through the conductor 70. In addition there is provided the current limiter 71 controlled by a switch 72 also receiving a signal from the conductor 70. Thus when the switch 72 is energized the current limiter 71 will serve to feed a current of a predetermined constant value to the junction 42 as in the previous embodiment.

In addition, there is provided means for detecting and preventing operation of the switch 28 when the position error signal exceeds a predetermined value. Accordingly the position error signal is transmitted through the conductor 74 to an absolute value detector 75. This detector serves to provide a signal to the comparator or amplifier 76 responsive to the absolute value of the compensated position error signal. This absolute value signal is compared with a DC voltage reference supplied to the terminal 77 from a source (not shown) to determine if the magnitude thereof is greater than a preselected value. If so, it is desirable that the position error signal not be attenuated because the movable member is beyond a boundary which is arbitrarily selected such that it is not desirable to slow the response of the closed loop servo system in correcting the position of the movable member. Thus if the error signal exceeds the level of the constant value signal supplied to the terminal 77, a signal will be supplied through the OR gate 81 and the conductor 70 to disable the switches 28 and 72 and prevent attenuation of the error feedback signal.

In the same manner there is provided in parallel with the circuit just described another circuit receiving the error signal through the conductor 74 and comprising a low pass filter 78 and an absolute value detector 79 supplying a signal to the negative terminal of an amplifier or comparator 80. To the positive terminal of the amplifier 80 is provided a servo error trip voltage for the purpose of enabling the operation of the circuit for attenuating the error signal only after the error signal has exceeded a predetermined value.

In this instance a low pass filter 78 is substituted for the signal shot described in the previous embodiments and serves to eliminate attenuation of the error signal in the lower frequency range. Thus the low pass filter passes low frequency signals which through the absolute value detector 79 are supplied to the terminal of the comparator 80. So long as these signals are greater than an Error Trip Voltage signal supplied from a source not shown to the terminal 82, no signal will be supplied to the AND gate 84. However at higher frequencies the transmitted error signal will diminish in absolute value, thereby causing the absolute value to fall below that of the error trip voltage and a signal will be supplied to the AND gate 84.

In addition, through the conductor 85 the error signal is supplied through an absolute value detector 86 and a comparator 87. This comparator also receives at the positive terminal thereof a Threshold Voltage signal from a source not shown. Thus only when the error signal drops below the Threshold Voltage signal will a signal be supplied to the AND gate 88. This AND gate can receive at the other terminal an Access Ready signal meaning that the movable member has approached and is within a predetermined distance of the desired position.

For instance in disc drives to be used in computer systems, the Access Ready signal serves to inform the computer system that the actuator is positioned to the desired cylinder address or line crossing. Such Access Ready signals usually are supplied when the read head is within an acceptable boundary of the desired position and are well-known in such systems. Thus without this Access Ready signal no subsequent signal will be supplied to the AND gate 84 which will be transmitted through the OR gate 81. The receiving of any signal through the comparator 80 will, upon passage through the OR gate 81, cause a setting of the switches 28 and 72 for attenuation of the error signal.

Thus it can be seen that circuits are provided to only enable attenuation of the error signal when the movable member has moved to a position within a predetermined distance of the desired position, has not subsequently moved away from the desired position a sufficient distance such that attenuation of the error signal is undesirable and further the frequency of the error signal is above a predetermined value such that attenuation is desirable for reducing resonance in the system. Of course other components can be used, however the principles of this invention, and specifically of this embodiment, assure that attenuation of the error signal will only take place when the movable member is close to the desired position such that the overall operation of the system will not be diminished substantially.

We claim:

1. A servo system for controlling the energization of an actuator employed to move a movable member in response to a cyclic power signal for positioning the movable member in accordance with a desired position signal, said system comprising:

position detecting means for generating a signal responsive to the present position of said movable member;

servo control means for comparing the desired and present position signals to generate a position error signal for controlling the magnitude and polarity of said cyclic power signal energizing said actuator to move said member toward the desired position; and attenuation means for reducing the magnitude of a portion of each cycle of said error signal after a predetermined time period and to a predetermined magnitude to attenuate said cyclic signal without causing a substantial phase shift thereof.

2. A servo system for controlling the energization of an actuator employed to move a movable member in response to a cyclic power signal for positioning the movable member in accordance with a desired position signal, said system comprising:

position detecting means for generating a signal responsive to the present position of said movable member;

servo control means for comparing the desired and present position signals to generate a position error signal for controlling the magnitude and polarity of said cyclic power signal energizing said actuator to move said member toward the desired position;

attenuation means for reducing the magnitude of a portion of said error signal to a predetermined magnitude to attenuate said error signal without causing a substantial phase shift thereof; and said attenuation means including means for sensing and signaling when the error signal passes through a zero crossover point during a signal cycle and attenuating said error signal for a predetermined time period following each zero crossover point in response to the signal indicating a zero crossover point has been detected.

3. A servo system as defined in claim 1 wherein the attenuating means reduces the magnitude of said portion of said cyclic power signal to a preselected magnitude other than zero magnitude.

4. A servo system as defined in claim 1 wherein said attenuation means reduces the magnitude of said cyclic power signal for a portion of each one-half cycle of the signal.

5. A servo system as defined in claim 1 including means for sensing the magnitude of the position error signal for preventing attenuation of said cyclic power signal when the position error signal is greater in magnitude than a preselected value.

6. A servo system as defined in claim 1 wherein said attenuation means includes a switching means connected to interrupt the transmission of the cyclic signal to the actuator when it is desired to attenuate said cyclic power signal.

7. A servo system as defined in claim 6 wherein said switching means includes a single shot switching circuit which opens the cyclic power circuit a predetermined time period to attenuate said cyclic signal.

8. A servo system for controlling the energization of an actuator employed to move a movable member in response to a cyclic power signal for positioning the movable member in accordance with a desired position signal, said system comprising:

position detecting means for generating a signal responsive to the present position of said movable member;

servo control means for comparing the desired and present position signals to generate a position error signal for controlling the magnitude and polarity of said cyclic power signal energizing said actuator to move said member toward the desired position;

attenuation means for reducing the magnitude of a portion of said error signal to a predetermined magnitude to attenuate said error signal without causing a substantial phase shift thereof; and said attenuation means including means for sensing and signaling each time the error signal passes through a zero crossover point during a signal cycle and said attenuation means being set to attenuate said error signal for a predetermined time period with said time period being measured from a first zero crossover point with the attenuation of the error signal commencing only when the error signal passes through the next zero crossover point.

9. A servo system for controlling the energization of an actuator employed to move a movable member in response to a cyclic power signal for positioning the movable member in accordance with a desired position signal, said system comprising:

position detecting means for generating a signal responsive to the present position of said movable member;

servo control means for comparing the desired and present position signals to generate a position error signal for controlling the magnitude and polarity of said cyclic power signal energizing said actuator to move said member toward the desired position;

attenuation means for reducing the magnitude of a portion of said error signal to a predetermined magnitude to attenuate said error signal without causing a substantial phase shift thereof;

means for sensing whether the error signal passes through a zero crossover point;

means to detect the polarity of the slope when the error signal passes through the zero crossover point;

means to detect the polarity of the drive signal being supplied to the actuator; and means to inhibit attenuation of the error signal by said attenuation means except during the period when the polarity of the error signal and the drive signal are in a predetermined relationship.

10. A servo system as defined in claim 1 wherein said attenuation means reduces the magnitude of a portion of each cycle of said error signal for a predetermined time period starting when the error signal passes through a zero crossover point.

* * * * *